(12) United States Patent  (10) Patent No.: US 8,102,758 B2
Monaghan et al.  (45) Date of Patent: Jan. 24, 2012

(54) ANALYZING VIRTUAL PRIVATE NETWORK FAILURES

(75) Inventors: John Monaghan, Clydebank (GB); Donald Iain Hunter, Torrance (GB)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 11/682,179

(22) Filed: Mar. 5, 2007

(65) Prior Publication Data

US 2008/0222282 A1  Sep. 11, 2008

(51) Int. Cl.
*G01R 37/08* (2006.01)

(52) U.S. Cl. ....................................................... 370/216

(58) Field of Classification Search .................. 370/203, 370/216–228, 229–240, 241–258, 351–356, 370/395.1–395.5, 395.52, 395.53, 298–306, 370/357–395, 395.21, 395.31, 395.32, 395.41, 370/395.42, 395.43, 395.6, 395.61, 396–411, 370/412–429, 503–520
See application file for complete search history.

(56) References Cited

U.S. PATENT DOCUMENTS

| | | | |
|---|---|---|---|
| 6,079,020 A * | 6/2000 | Liu ................................ | 726/15 |
| 6,173,399 B1 * | 1/2001 | Gilbrech ....................... | 713/153 |
| 6,701,437 B1 * | 3/2004 | Hoke et al. ....................... | 726/15 |
| 6,987,757 B1 * | 1/2006 | Akiyama et al. .............. | 370/353 |
| 7,068,640 B2 * | 6/2006 | Kakemizu et al. ............ | 370/349 |
| 7,313,605 B2 * | 12/2007 | Iloglu et al. ................... | 709/219 |
| 7,568,047 B1 * | 7/2009 | Aysan et al. .................. | 709/238 |
| 2003/0088698 A1 * | 5/2003 | Singh et al. ................... | 709/239 |
| 2003/0115367 A1 * | 6/2003 | Ohara ............................ | 709/249 |
| 2004/0037275 A1 * | 2/2004 | Li et al. ......................... | 370/370 |
| 2004/0066747 A1 * | 4/2004 | Jorgensen et al. ............. | 370/241 |
| 2004/0174879 A1 * | 9/2004 | Basso et al. .................... | 370/392 |
| 2005/0083955 A1 * | 4/2005 | Guichard et al. .............. | 370/409 |
| 2005/0207410 A1 | 9/2005 | Adhikari et al. | |
| 2006/0002409 A1 * | 1/2006 | Menon et al. .................. | 370/409 |
| 2006/0072589 A1 * | 4/2006 | Mandavilli et al. ........... | 370/400 |
| 2006/0126495 A1 * | 6/2006 | Guichard et al. .............. | 370/216 |
| 2006/0215579 A1 | 9/2006 | Nadeau et al. | |
| 2007/0008895 A1 | 1/2007 | Perkins et al. | |

(Continued)

FOREIGN PATENT DOCUMENTS

EP          1689124 A          8/2006

(Continued)

OTHER PUBLICATIONS

VPN Devices. Chapter 1. What is a Virtual Private Network? http://www.ciscopress.com/content/images/1587051796/samplechapter/1587051796content.pdf. Last accessed Dec. 13, 2006. pp. 5-23.

(Continued)

*Primary Examiner* — Kwang B Yao
*Assistant Examiner* — Jung-Jen Liu
(74) *Attorney, Agent, or Firm* — Schwegman, Lundberg & Woessner, P.A.

(57) ABSTRACT

The specification provides information for determining any impacted customers, virtual private networks, circuits, and devices following a path failure. The specification uses an information-gathering component to find system information and uses the system information in determining any impacted units. A report is created that allows a network management system to process the impacted units. If any of the impacted units are customer devices, then the management system calculates the impact on the customer based on a Service Level Agreement.

20 Claims, 14 Drawing Sheets

U.S. PATENT DOCUMENTS

| | | | |
|---|---|---|---|
| 2007/0011317 A1* | 1/2007 | Brandyburg et al. | 709/224 |
| 2007/0140250 A1* | 6/2007 | McAllister et al. | |
| 2007/0226630 A1* | 9/2007 | Farid et al. | 715/734 |
| 2007/0280241 A1* | 12/2007 | Verma | 370/392 |
| 2008/0002697 A1* | 1/2008 | Anantharamaiah et al. | 370/392 |
| 2008/0075997 A1* | 3/2008 | Fuse et al. | 429/30 |
| 2008/0091822 A1* | 4/2008 | Sheinfeld et al. | 709/224 |

FOREIGN PATENT DOCUMENTS

| | | |
|---|---|---|
| WO | WO-2008109279 A2 | 9/2008 |

OTHER PUBLICATIONS

International Search Report and Written Opinion dated Sep. 4, 2008 for PCT Application Serial No. PCT/US2008/054840, 11 Pages.

* cited by examiner

ANALYZING VIRTUAL PRIVATE NETWORK FAILURES

FIELD OF THE SPECIFICATION

The specification relates generally to communication systems and in particular to systems and methods for determining impact from Virtual Private Network (VPN) communication failures.

BACKGROUND

Many businesses use a Virtual Private Network (VPN), or multiple interconnected VPNs for handling larger amounts of information, to support confidential communication. VPNs use tunnel protocol paths, or in a specific configuration, Label Switched Paths (LSPs), allow information (commonly called traffic) to travel between two network elements (e.g., routers) by providing a path on which traffic can travel. VPNs can vary in degree of complexity depending on the number of devices between two Customer devices. For example, the two Customer devices could be a laptop computer communicating with a server.

When multiple VPNs are interconnected, core LSPs often carry traffic for more than one VPN similar to non-core LSPs that carry traffic between two routers. A set of core LSPs make up an overall data plane. Many MPLS VPNs use Virtual Routing and Forwarding (VRF) to allow multiple data planes to co-exist in the same router at the same time. In these configurations, VPN message traffic travels either over the Internet or over a service provider's private network. A Service Level Agreement (SLA) is used to define an area of a private network used by a VPN user. An SLA is generally a part of a full service contract between a VPN service provider and a VPN customer.

The use of VPNs has become prevalent in recent years. There are numerous benefits to using VPNs. One benefit is that VPNs allow for secure communications in areas where there is limited communication security. A further benefit arises because a single location can manage numerous remote locations, allowing for greater network support. Moreover, VPNs allow secure communication across vast distances. For example, a device in India can securely communicate with a device in Great Britain. There are also secondary benefits that follow from secure, long distance communication. For example, integrated communication between two individuals in different countries can greatly reduce mailing costs, travel costs, and other costs incidental to conventional forms of communication.

DESCRIPTION

Overview

Figure 1:
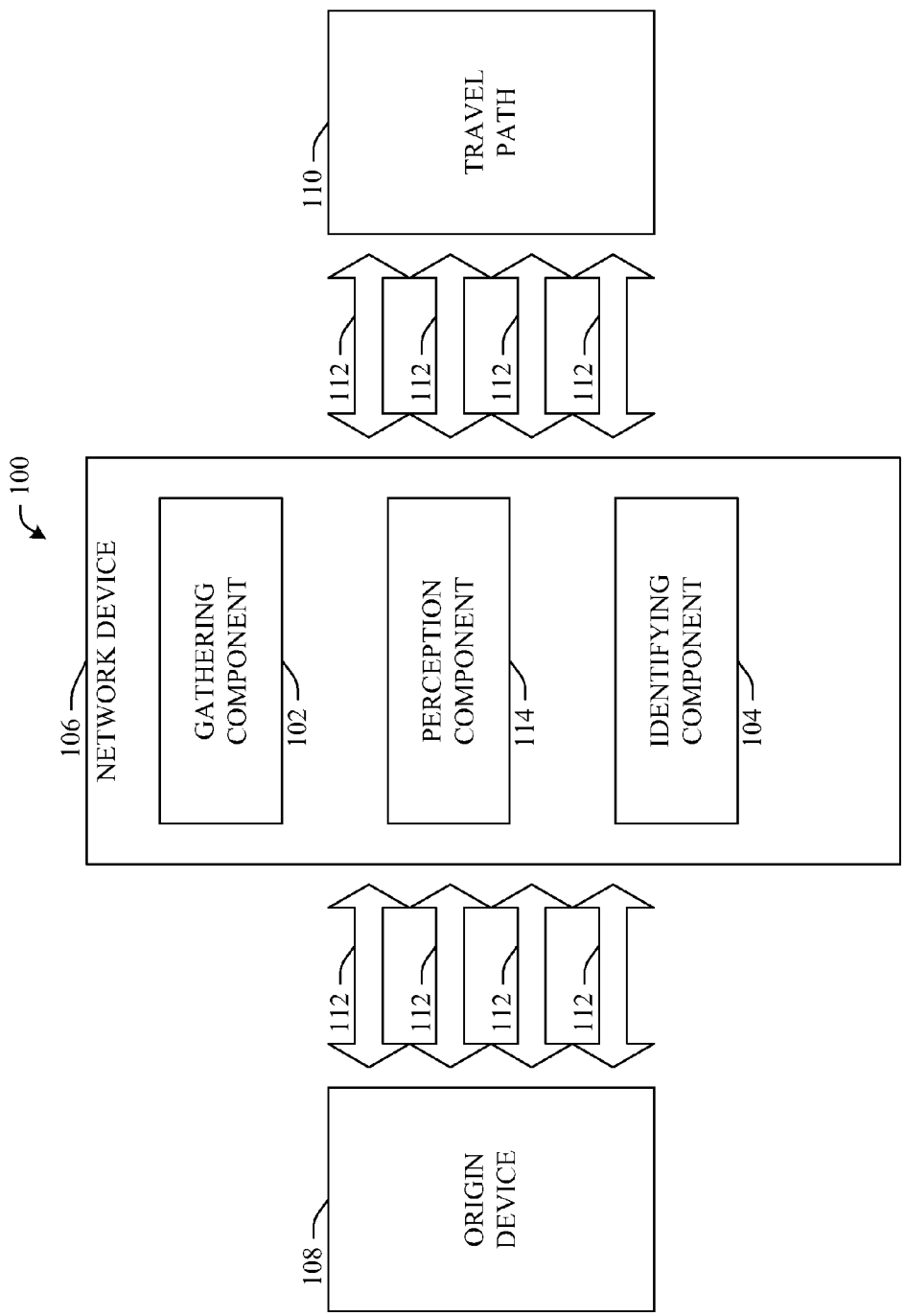
FIG. 1 illustrates a block diagram of a typical network device and information transferring structures in accordance with an aspect of the specification.

The following presents a simplified overview of the specification in order to provide a basic understanding of some aspects of the specification. This overview is not an extensive overview of the specification. It is intended to neither identify key or critical elements of the specification nor delineate the scope of the specification. Its sole purpose is to present some concepts of the specification in a simplified form as a prelude to the more detailed description that is presented later.

Emerging troubleshooting methods can detect a cause of a failure and possibly why a failure occurred, but it cannot identify customer devices impacted by the failure. Therefore, additional analysis is necessary to achieve full failure impact analysis. In brief overview, the subject specification is of a mechanism for interrogating network devices for determining an impact of a failure. In other words, the subject specification enables interrogation of system components (e.g., network devices) in order to determine presence and impact of network communication failures. This on-demand failure determination can take place without a need for an offline topology map. However, the failure can still take place in conjunction with an offline topological map. This means that the subject specification can operate in a system that also uses an offline topological model as well as a system with no offline topological model.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DESCRIPTION OF EXAMPLE EMBODIMENTS

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter. Although the following scenarios are directed to a Multi-Protocol Label Switching (MPLS) network, it is to be understood the concepts described herein can be employed in other networks. It is important to point out that many of the acts described below can be performed in alternative manners. As utilized herein, the terms "network failure", "communication failure", "LSP failure" and the like are all interchangeable. As utilized herein, the terms "act", "event", and "action" and the like are all interchangeable. As utilized herein, the terms "information", "criteria", and "parameters" and the like are all interchangeable.

As networks evolve, it is particularly important to develop ways for providing fault protection and failure reporting in network management. Fault protection and failure reporting in many networks involves a management system that possesses a complete offline topological map of a network. Each individual device associated with the network reports individual failures to the management system. The management system then maps the fault and attempts to determine the impacts of failures. For example, a customer facing interface failure commonly only affects one customer, while a core network interface failure usually affects many customers. From a business perspective, one important benchmark for establishing a successful network is reducing an impact that a failure has upon a customer.

There are many flaws with this typical fault protection and failure reporting method. First, having an offline topological map is often very expensive to create and maintain. In addition, having an offline topological map uses a number of system resources and takes a lot of time to create and process. A typical network system is constantly changing as a result of an addition and subtraction of network devices as well as the re-routing of network paths. Cost, time, and resource requirements associated with network maintenance make a frequent uploading and removal of devices, which are required to interpolate the network structure, a burdensome task. Probes that can perform enhanced fault management and impact detection run in their devices and initiate monitoring messages that check an actual data path. If a failure takes place, then a meaningful error report about the failure can be created, for example, to identify impact of the failure.

FIG. 1 is an example portion of a virtual private network (VPN) 100. A gathering component 102 and an identifying component 104 of the subject specification are located in a network device 106. The network portion has a network device 106, an origin device 108, and a travel path 110. The origin device 108 sends data to the network device 106. Commonly, the origin device 108 is a Customer Edge (CE) device. Typical, network devices 106 are routers and switches. Connected to these CE devices are Customer devices, such as a personal computer, a personal digital assistant, or a cellular telephone. An example of data sent by an origin device 108 is an electronic document created by a user in a word processing program. A common origin device 108 attaches several identifiers to the data, such as a label (which identifies an intended destination) which is usually in an MPLS header, an Internet Protocol (IP) header, and a Transmission Control Protocol (TCP) header.

A network device 106 sends data to a travel path 110. This data can be most any type of data. For example, it can be a file, such as an electronic document sent between two CE devices, or a command sent from one Customer device to another. Between the origin device 108 and the network device 106, as well as between the network device 106 and the travel path 110, are communication links 112. These links 112 can be the platform upon which the data travels. It is possible that none of the links 112 exist in a VPN as disclosed if the origin device 108, network device 106, and travel path 110 integrate together and form one unit. While four links 112 are shown for each connection, any numbers of links 112 are possible for each connection, including an uneven number of links 112, meaning one communication link 112 between the origin device 108 and the network device 106 and six links between the network device 106 and the travel path 110.

The travel path 110, commonly a Label Switched Path (LSP), can transfer data to a destination device. In many cases, the destination device is also a CE device and the final target of the data is a Customer device. However, there could be a management component (not shown) or storage component (not shown) that the data travels to directly. Often times, a communication failure, transfer deficiency, or transport breakdown can occur along the travel path 110. This breakdown (or failure) can be found by a perception component 114 in the network device that determines when a communication failure occurs. Many different types of failures can occur, e.g. the data can fail to reach the destination device and/or the data can reach the destination device in a corrupted format. In addition, the data may be corrupted to a state where the data cannot find its ultimate location. The origin device 108, network device 106, and/or travel path 110 can be configured to act upon the data, e.g. these entities may send the data to a storage location or attempt to transfer the data along another travel path. In addition, a gathering component 102 and/or identifying component 104 can also operate on system information or data in order to facilitate failure analysis.

A gathering component 102 gathers subject matter about a VPN in the event of a communication failure. The gathering component 102 can gather virtually any type of details. Examples of standard information that the colleting component 102 can gather is label information, IP address information, host name information, affected VPN routing/forwarding instances (VRFs) information, and interface information. The gathering component 102 can be configured to obtain information while a network is in proper operation (e.g., when there is no communication failure). Much of the information gathered by the gathering component 102 resides at an information sending device, or a source side An identifying component 104 identifies any units impacted by the communication failure based on information obtained by a gathering component 102. An example of an impacted unit is a CE device or a Customer device. A network device 106 can identify customers impacted on a destination side (e.g., an impacted destination device). This determination is usually made from information gathered by the gathering component 102. For example, the identifying component 104 can perform a look up operation for all impacted units associated with specific label information, based on label information gathered by the gathering component 102 and contained within the MPLS header. This allows for an identification of impacted network devices without an offline topological network map.

Figure 2:
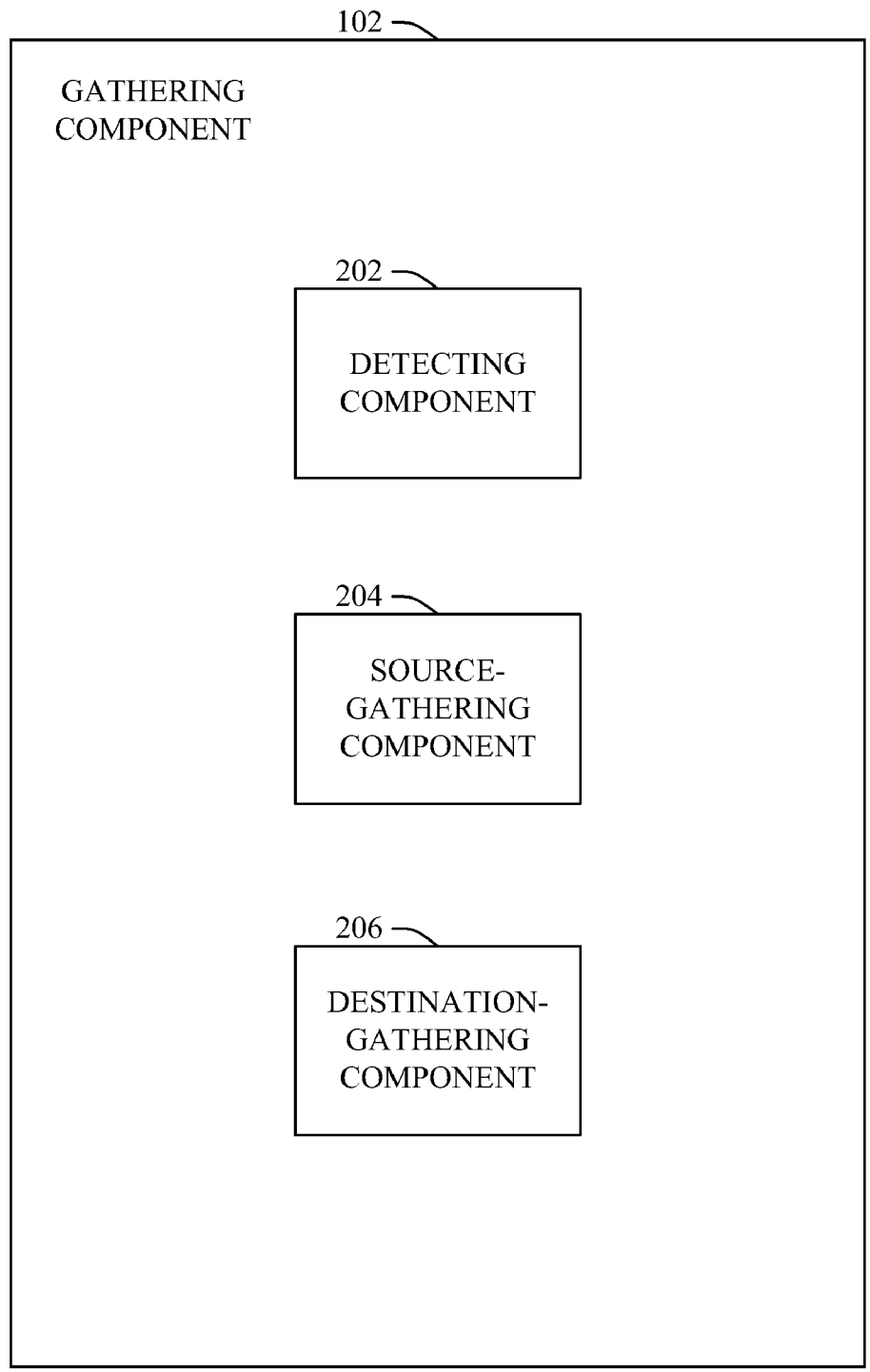
FIG. 2 illustrates a block diagram of a representative gathering component.

FIG. 2 depicts an example block diagram of a colleting component 102. The gathering component 102 can be a component found in a network device 106 that can obtain various types of information. Typically, a gathering component 102 has a number of subsidiary components that gather different types of information. Any of these components can integrate together in whole or in part to form a unit, or can be separate with communication links between them.

A detecting component 202 can be configured to detect information e.g., the presence of interfaces as well as devices connected to a network and/or a network device. In addition, the detecting component 202 can detect information paths, including intended information paths and unintended information paths as well as devices. For example, if a configuration exists that allows a system to re-route information across an alternate information path when a failure occurs, then the detecting component 202 can detect a most optimal path for re-routing this information. In another example, if there is a configuration that allows information to be stored if a failure occurs, then the detection component 202 can detect a suitable storage location.

A source-gathering component 204 gathers information about a source. Information that source-colleting component 204 can gather includes, but is not limited to, a host name, a label, a route, and a VRF. More specifically, an Internet Protocol (IP) address typically relates to a system with a host name. Many systems are better equipped to operate with host names then IP addresses, which is one reason why the source-gathering component 204 obtains the host name. Another example involves gathering all labels from a source side of a communication, which can be used by other components to determine any impacted unit. Much of the information gathered by the source-gathering component 204 is information detected by the detecting component 202. For example, the detecting component 202 can determine if there are any source connected routes wherein the source-colleting component 204 can obtain more specific information about those routes, which could be communication links 112.

Figure 3:
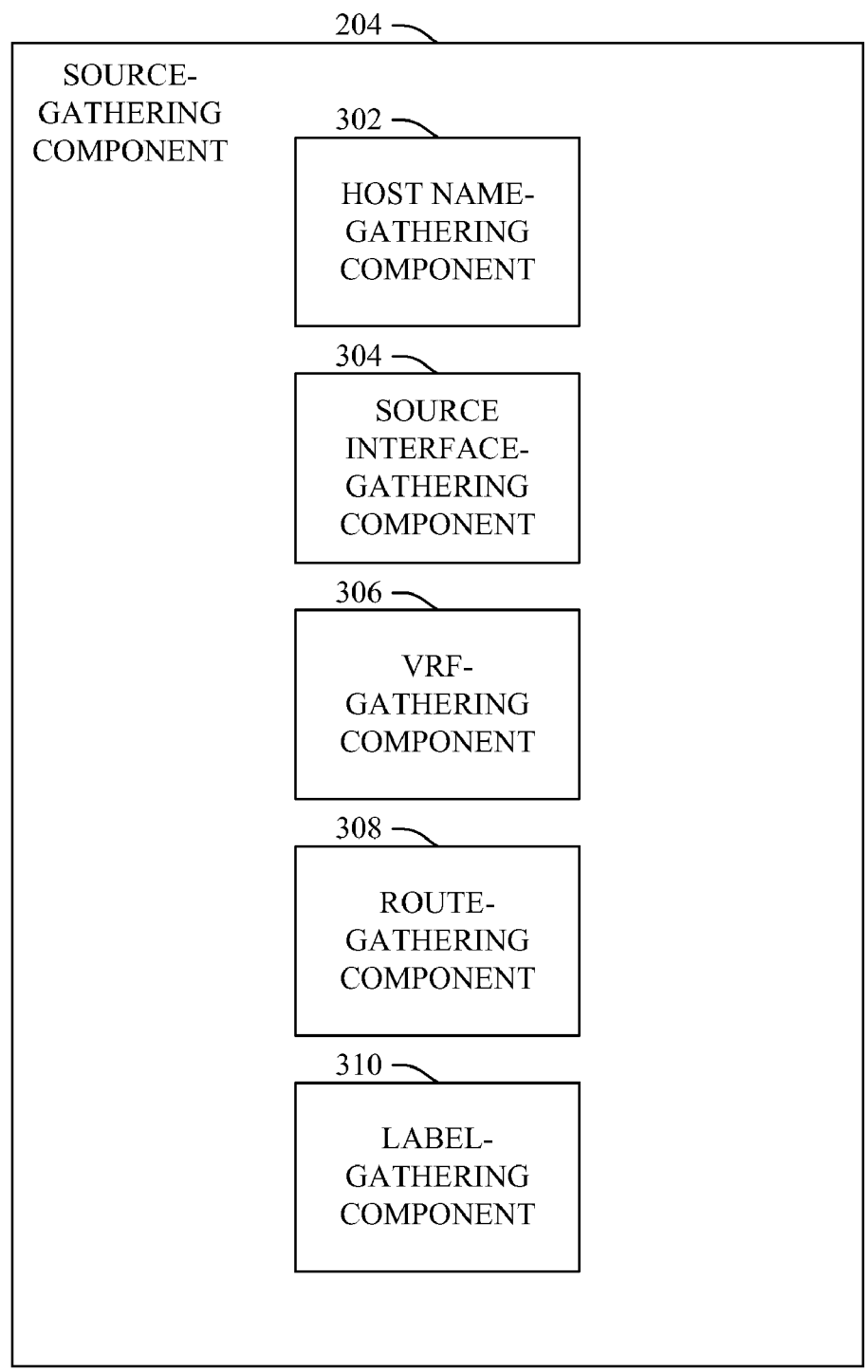
FIG. 3 illustrates a block diagram of a representative source-gathering component.

A destination-gathering component 206 gathers information about an intended destination of the data that was unable to continue across a travel path 110. An example of information the destination-gathering component 206 can gather is a hostname, a VRF, and/or interfaces. However, as in the aforementioned example, the destination-colleting component 206 would most likely not gather information about an interface as an interface-gathering component 208 could be employed to retrieve such data. It is to be appreciated that both the destination-gathering component 206 and interface-gathering component 208 can be employed to obtain information about interfaces. As was with the source-colleting component 204, much of the information gathered is information about things detected by the detecting component 202. For example, the detecting component 202 can detect if there are any VRFs FIG. 3 is an example of a source-gathering component 204. FIG. 3 shows a host name-gathering component 302, a source interface-gathering component 304, VRF-colleting component 306, a route-gathering component 308, and a label-gathering component 310 integrated into the source-gathering component 204.

The host name-colleting component 302 gathers a host name of an IP address that has transmitted data. Since many systems operate off host names, gathering a host name of an IP address can simplify subsequent calculations and determinations. The source interface-gathering component 304 commonly gathers affected interfaces on a source side connected to a local site. A VRF-gathering component 306 gathers names of affected VRFs from a source based on a returned destination address from the perception component 114 of FIG. 1. In many instances, the perception component 114 of FIG. 1 functions as a probe to determine a failure. The probe returns a destination address that allows a set of affected VRFs to be identified. VRFs allow multiple tables to exist in a common router simultaneously. Consequently, some VRFs can be affected while others are not depending on whether a VRF connects to a failed travel path (e.g., 110 of FIG. 1). The route-gathering component 308 gathers names of affected routes from a set of affected VRFs. Normally, routes are simply paths on which data travels, e.g. communication links 112 of FIG. 1.

Additionally, the label-gathering component 310 extracts a label from data. An origin device (e.g., 108 of FIG. 1) commonly places a label on data, which identifies an intended destination for the data. This label can ultimately be used in determining impacted units without reliance on an offline topological network map. There can be occurrences where the data destination is not the same as the affected destination. For example, if an LSP going from a first Provider Edge device (PE) to a second PE device is broken, then the data destination is the second PE device. There can be occurrences where the travel path (e.g., a LSP) is broken, thereby affecting reachability to destinations beyond the end of the travel path that were previously reached from beyond the start of the travel path. Every impacted destination is uniquely identifiable by a label. Labels can be obtained from a set of impacted VRFs on the source side.

Figure 4:
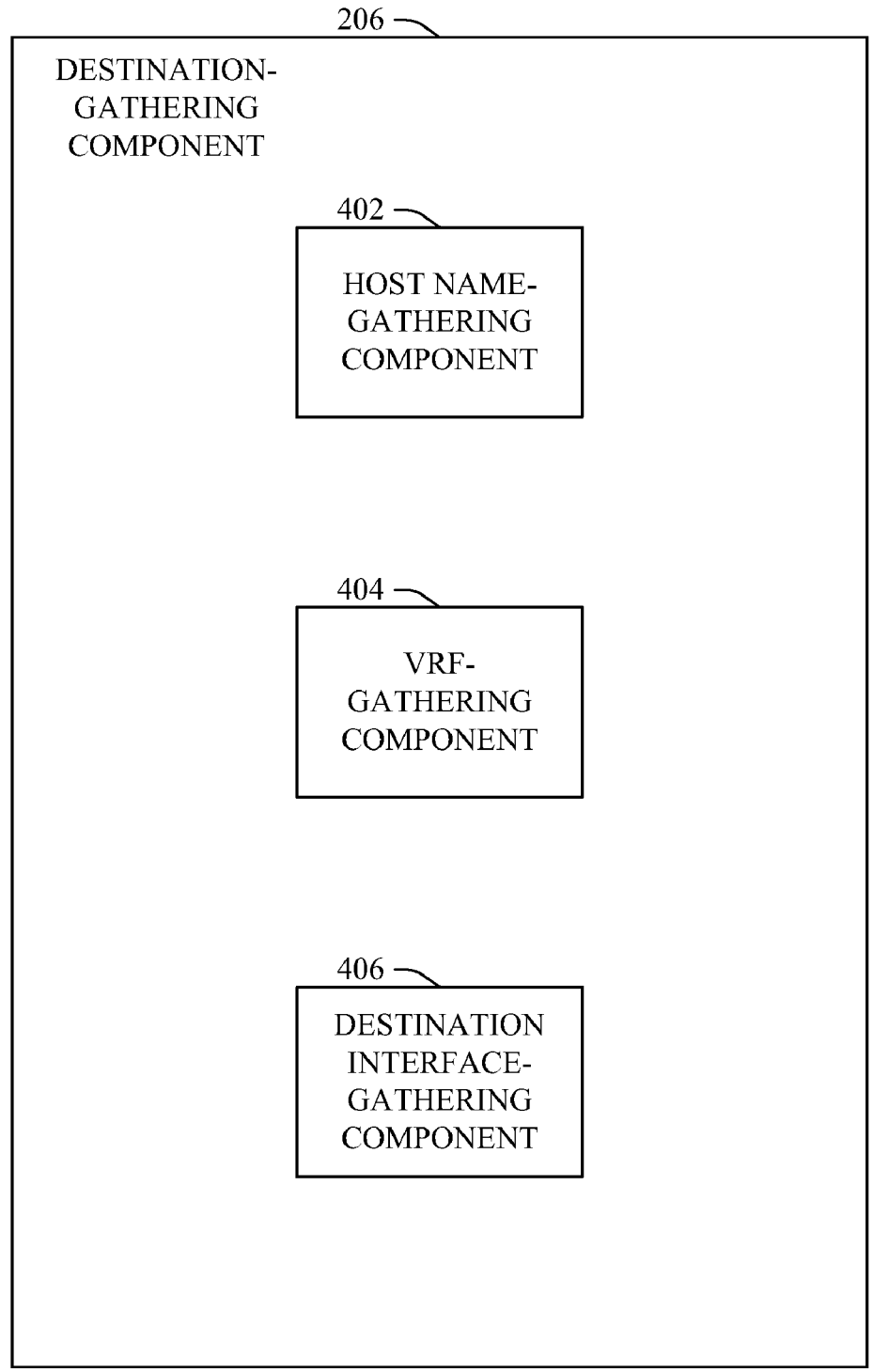
FIG. 4 illustrates a block diagram of a representative destination-gathering component.

FIG. 4 is an example destination-colleting component 206. Since, in typical operation, most information gathered is source information, there are fewer components in the destination-colleting component 206. The host name-gathering component 402 obtains a host name of an intended destination from an IP address. This is useful since many networks operate using host names as opposed to IP addresses. The VRF-gathering component 404 gathers affected VRFs on the destination. This is done by using gathered labels from a source side to identify affected VRFs on a destination side. Again, since there can be multiple VRFs in a router, both affected VRFs and non-affected VRFs can exist in a common router. In addition, a destination interface-gathering component 406 gathers affected interfaces on the destination. This is done by identifying entries in a VRF table that correspond to labels derived from a source side. The VRF table in turn provides information on affected interfaces. There are fewer components and less information gathered concerning the destination-colleting component 206 than the source-gathering component 204, due in part to the fact that there is no direct communication with a destination because a travel path failure can render direct communication with the destination inoperable.

While the example of FIGS. 2, 3, and 4 show a specific embodiment of the subject specification, many other alternative embodiments can be practiced. For example, there can be extraction of certain components and a combination of others. One example is the extraction of a source interface-gathering component 304 and a destination interface-gathering component 406, shown in FIG. 3 and FIG. 4 respectively. These two extracted components could be combined into a general interface-gathering component (not shown) and placed into a gathering component 102 shown in FIG. 2.

Figure 5:
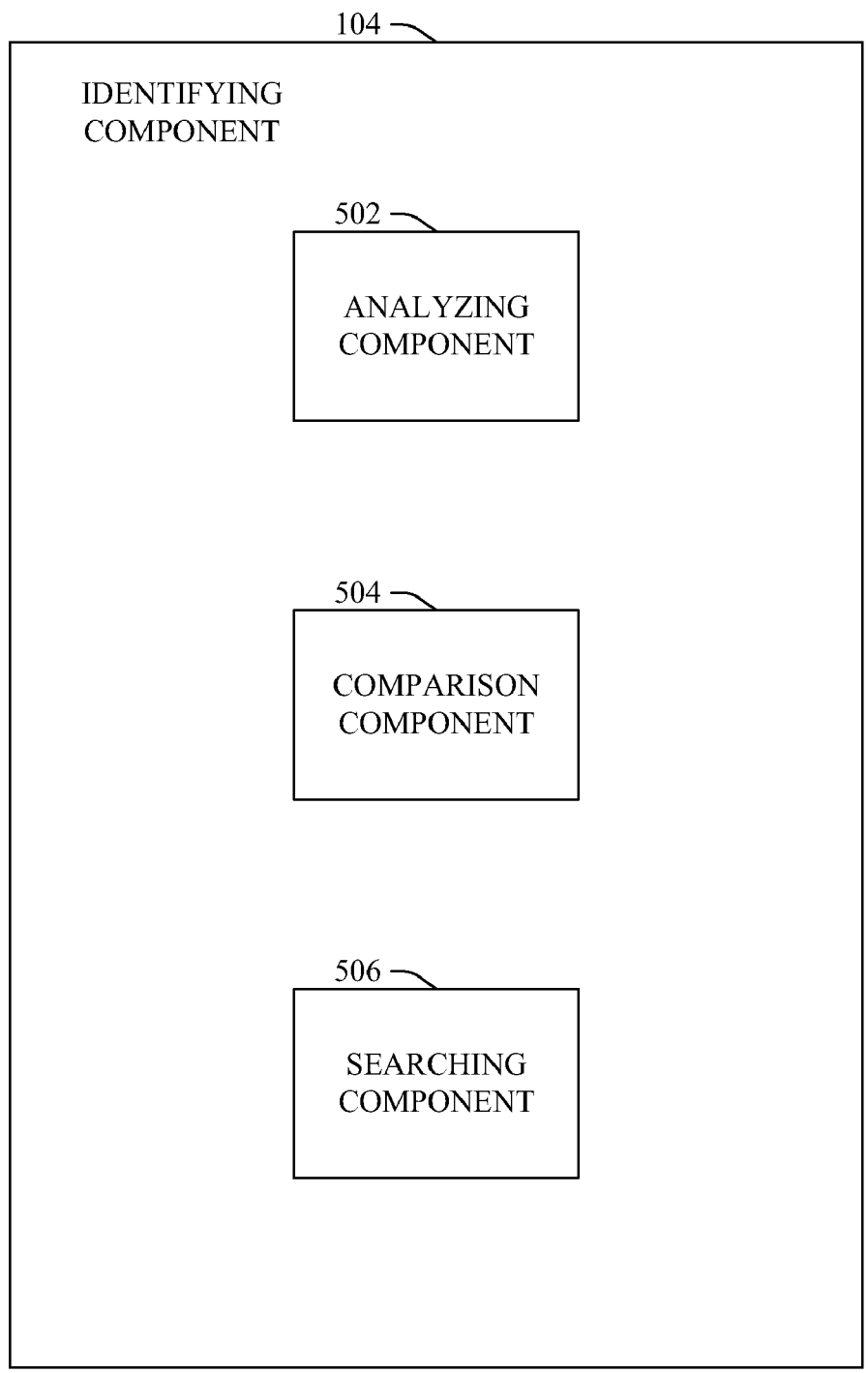
FIG. 5 illustrates a block diagram of an identifying component in accordance with an aspect of the specification.

FIG. 5 is an example identifying component 104 which can be a component found in a network device. A prototypical identifying component 104 can contain several components, such as an analyzing component 502 that analyzes information (commonly information obtained by a separate collating component), a comparison component 504 that compares data to gathered information, and a searching component 506 that finds affected entities. Any of these components (502, 504, and 506) can integrate together in whole or in part to form a unit, or they can be separate and have communication links between them.

The analyzing component 502 typically analyzes data sent by an origin device 108, for example, a label that is attached to data. This label is particularly important because a label signifies an intended destination, commonly the end of a tunnel path. In operation, for example, a label can have an identification of 38. The analyzing component determines an IP address associated with label 38 that is used to obtain a set of VRFs. The IP address is commonly an address of an end of a tunnel path. The set of VRFs are obtained on the basis of VRFs that have the destination address as a Next Hop (e.g., those VRFs that have routes that can only be reached by going through the destination address). There is commonly a minimum of two labels. One for testing a connection and one for identifying affected routes. Label 38 functions as a test label and it is used to obtain a set of VRFs based on the destination. A comparison component 504 typically compares data, such as a label, analyzed by the analyzing component 502 against information, such as information located in a source device. For example, transported data can have a label named label 38, which corresponds to a specific tunnel path. If a communication failure occurs, the analyzing component 502 determines which IP address corresponds to the label data. A comparison component 504 first determines the set of VRFs that use the IP address and then within these VRFs, the set of customer destination labels would use this IP address to reach the end of the tunnel path. A searching component 506 searches for all other destinations that the comparison component 504 identifies. These located destinations are the impacted units. In this manner, an impact of a failure upon a device can be determined without any contact with a destination device and without the use of an offline topological map. These impacted devices each relate back to customers who are impacted by the travel path failure.

While there are no connections shown between each component, there is no requirement concerning direct connections. There can be direct connections between any or all components. For example, in FIG. 2, the detecting component 202 can connect directly to both the source-gathering component 204 and destination-gathering component 206, while there is no direct connection between the source-gathering component 204 and the destination-gathering component 206.

Figure 6:
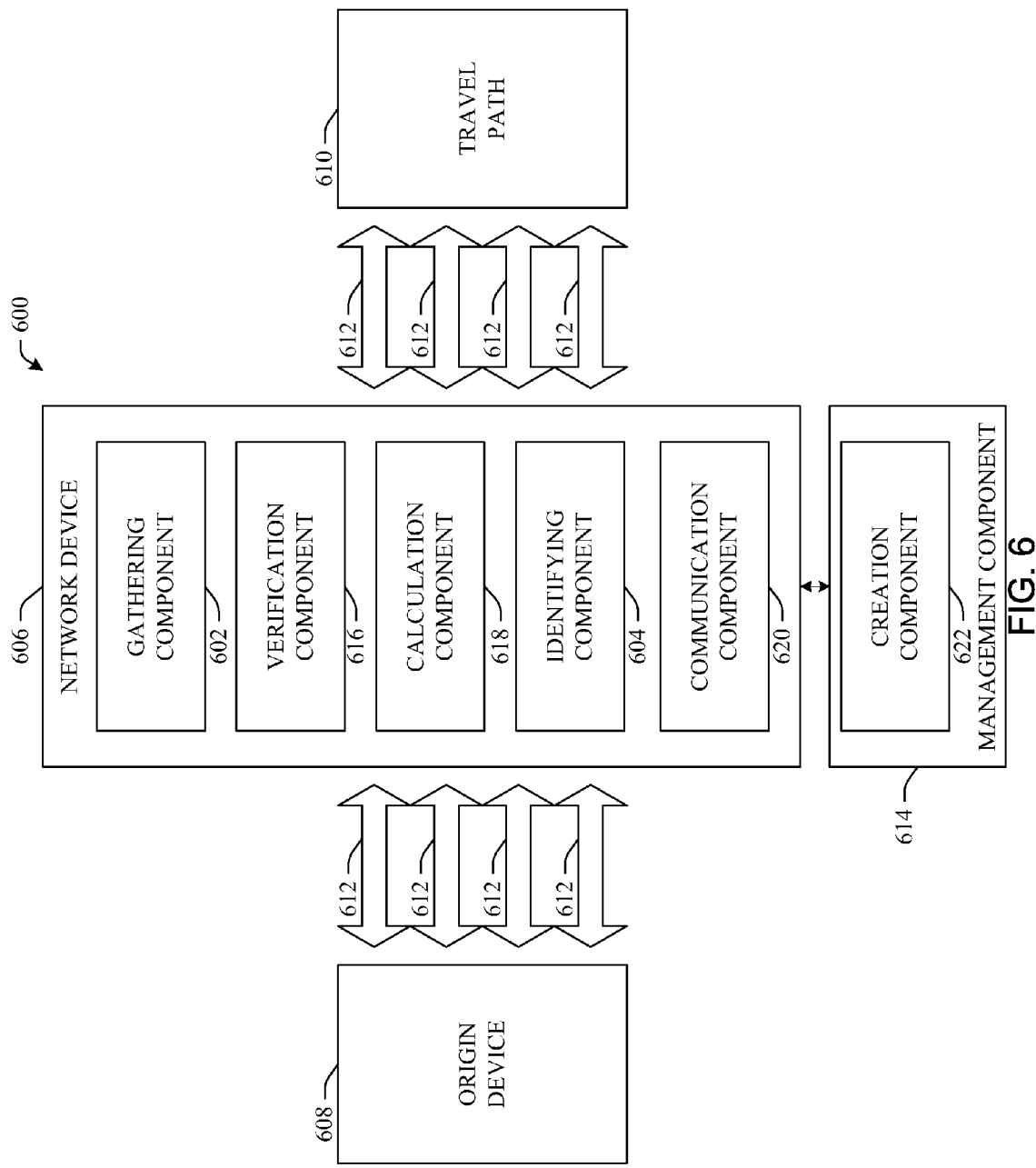
FIG. 6 illustrates an example block diagram of a network device and attached structures.

FIG. 6 is an example portion of an alternative virtual private network 600. The alternative VPN 600 has a gathering component 602, identifying component 604, a network device 606, an origin device 608, a travel path 610, and communication links 612, which are similar to the devices found in FIG. 1. In addition to those units, there is a management component 614, a verification component 616, a calculation component 618, a communication component 620, and a creation component 622. In addition to the components of FIG. 1, the network device 606 of FIG. 6 generally includes a verification component 616 that checks for a VPN failure, a calculation component 618 that calculates remote endpoints, and a communication component 620 that communicates any information to a management component 614. The management component 614 of FIG. 6 usually contains a creation component 622 that creates an electronic report as a result of information received by the communication component 620.

An origin device 608 sends data to a network device 606 though communication links 612 (e.g., routes). A typical origin device 608 is a CE device. This CE device is usually a device that connects a VPN to an individual customer. A common form of diagnostics is using an offline topological model or map. Some difficulties in utilizing an offline topological model often arise from a continuous addition and subtraction of CE devices and Customer devices to a VPN. Moreover, difficulties arise from other events and/or locations, for instance consumption of resources that could be dedicated to other operations. A typical network device 606 is a PE device, which is often times a router or a switch. The network device 606 connects to a travel path 610 and sends data down the travel path 610. A travel path 610 can be an LSP path. A network device 606 that sends data down a travel path 610 is often referred to as a source because it is a starting point of a communication in an MPLS core. The network device 606 connects to the travel path 610 by way of communication links 612. These links 612 can be the same kind of links 612 as those that connect the origin device 608 and the network device 606. This functionality is similar to the functionality shown in FIG. 1. In addition, the network device 606 connects to a management component 614, which manages information and can create a report through a creation component 622.

A network device 606 in the subject specification generally has several components including both an identifying component 604 and a gathering component 602, which can be the same or similar to the components described in FIG. 2 and FIG. 5. A gathering component 602 gathers information about a system, usually source information, destination information, and interface information. Generally, this is an array of information including information about a source and a destination. This information commonly comprises labels, as well as VRFs, routes, etc. An identifying component 604 identifies any impacted units based on the information collected by the colleting component 602. Normally, there are other components present in the network device. A verification component 616 often verifies that a communication failure is still active along a travel path. A calculation component 618 calculates remote endpoints and a communication component 620 sends information to other components, e.g. a management component 614.

A verification component 616 performs a check to see if there is still a failure. The verification component 616 can include the features of the perception component 114 disclosed in FIG. 1 or the two components can be separate. In normal operation, the network device 606 sends a signal indicating that a failure has occurred and the network device 606 receives a signal to perform any necessary actions, which are accomplished by the various components. The verification component 616 usually functions prior to any other component in the network device 606. This is because it is often inefficient for any other component in the network device 606 to operate if there is no longer a communication failure. However, it is possible for the verification component to function at any time, including prior to a failure, in between the operations of other components, or during the operation of other components. A calculation component 618 calculates remote endpoints of a destination that commonly connect to the travel path 610. This can specifically determine a location of the source and destination.

A communication component 620 communicates a location of an intended destination and any remote sites to a management component 614. While the location of the intended destination and remote sites are usually important, the communication can communicate virtually any information, including results from operations associated with each component, e.g., a verification check. Often times, the communication component 620 communicates other information to a creation component 614, for example the information gathered by the source-gathering component 204.

A creation component 622 creates a report based on received information, including both the intended destination as well as other information. The creation component 622 can be configured to perform other tasks besides creating failure reports, for example creating updates of the management component 614 status (e.g., creating a message that the management component can receive information). Predominantly, the creation component 622 is located within a management component 614, which is generally a network management device. However, the creation component 622 can be located in places other then a management component 614, including in the network device 606. If the creation component 622 is located within the network device 606, then the communication component 620 commonly communicates the report instead of information, for example communicating the report to a management component 614. While a direct link is depicted in FIG. 6 between the network device 606 and the management component 614, there can be other devices or components between the network device 606 and the management component 614. For example, there can be a notification component (not shown) that sends an administrator a message (e.g. an e-mail) that there is a report of failure information.

Figure 7:
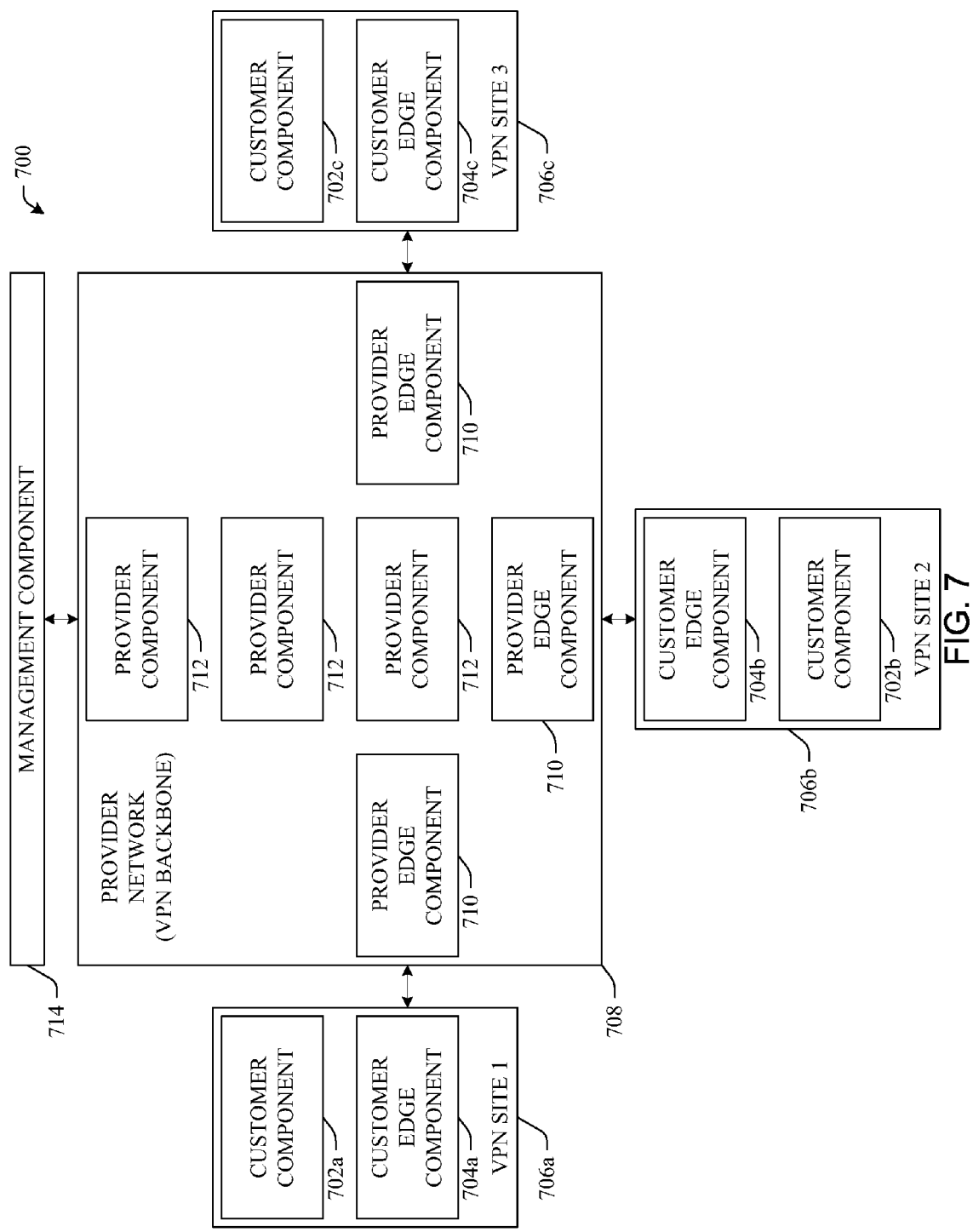
FIG. 7 illustrates an example block diagram of a typical VPN (Virtual Private Network).

FIG. 7 is an example of a VPN 700. Many times a component can be represented as a device. In typical customer networks, Customer devices 702 and CE devices 704 are the main categories for devices at a VPN site 706 Customer devices 702 are generally devices that are in direct contact of the service provider network and are unaware of the VPNs. A service provider network 708 can also be referred to as a VPN backbone 708 or a MPLS core 708. CE devices 704 connect to the provider network 708 with PE devices 710. The CE device 704 is aware of the VPN in a CE-based network, yet the CE device 704 is unaware in a PE-based network. PE devices 710 are often routers, switches, or both. Provider devices 712 function to connect PE devices 710 together.

For example, in a typical VPN, a first VPN site 706*a* has a Customer device 702*a* connecting to a CE device 704*a*. The CE device 704 connects to a PE device 710, thus bridging the gap between a VPN site 1 706*a* and a provider network 708. The PE device 710 connects to a Provider device 712, which connects to another PE device 710. This PE device 710 connects to another CE device 704*b*; bridging the gap between the Provider Network 708 and another VPN site 706*b*. In the second VPN site 706*b*, the CE device 704*b* connects to a Customer device 702*b*. Depending on the VPN format, there are usually slight variations of this configuration. For example, in multi-layer networks, such as Virtual Private LAN Service, PE devices 710 divide between User-facing PE devices and Network-facing PE devices to add stability to the network. Additionally, many VPN provider networks 708 connect to a management component 714, such as a network management device. The management component 714 is generally used for storing information about the overall VPN 700. It is possible for the management component 714 to keep an offline topological map of the network even with the implementation of the subject specification.

Figure 8:
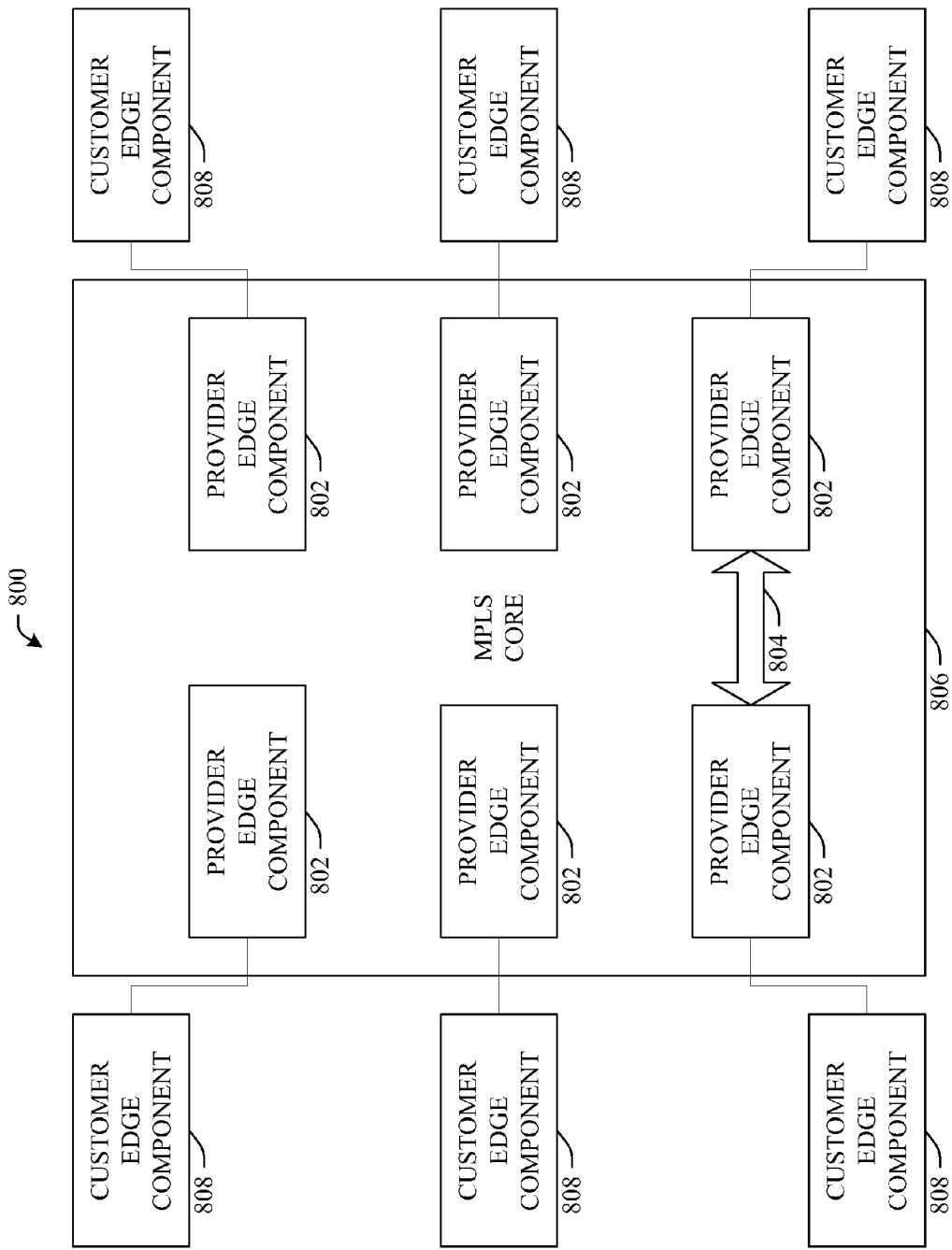
FIG. 8 illustrates an example block diagram of a typical partial VPN with a MPLS (Multi-Protocol Label Switching) core and customer communication.

FIG. 8 is an example VPN 800. While the drawing shows specific devices that are oftentimes important, it is not required that any or all of these devices be present to operate the subject specification. Generally, each component functions as a device. Two PE devices 802 connect together through an LSP path 804 within an MPLS core 806. While one LSP path 804 is shown, there can be numerous LSP paths within an MPLS core; including one connected each PE component to one another. One PE device 802 functions as a source while another PE device 802 functions as a destination. These designations are commonly dynamic in nature and can change for different applications. Both the source and the destination usually connect to at least one CE device each 808. In typical operation, a CE device 808 connected to a source sends information to a PE device 802 so it can be transported to an intended CE device. Normally, this transportation takes place partially over a LSP path 804. If a failure occurs across the LSP path 804, then the information does not reach the intended CE device 808. The source PE device 802 is configured to obtain various amounts of information and based on this information the PE device determines the intended CE device, similar to that of 100 and 600 of FIGS. 1 and 6 respectively. The MPLS core 806 is similar to the VPN Backbone 708 or Provider Network 708 in FIG. 7.

Figure 9:
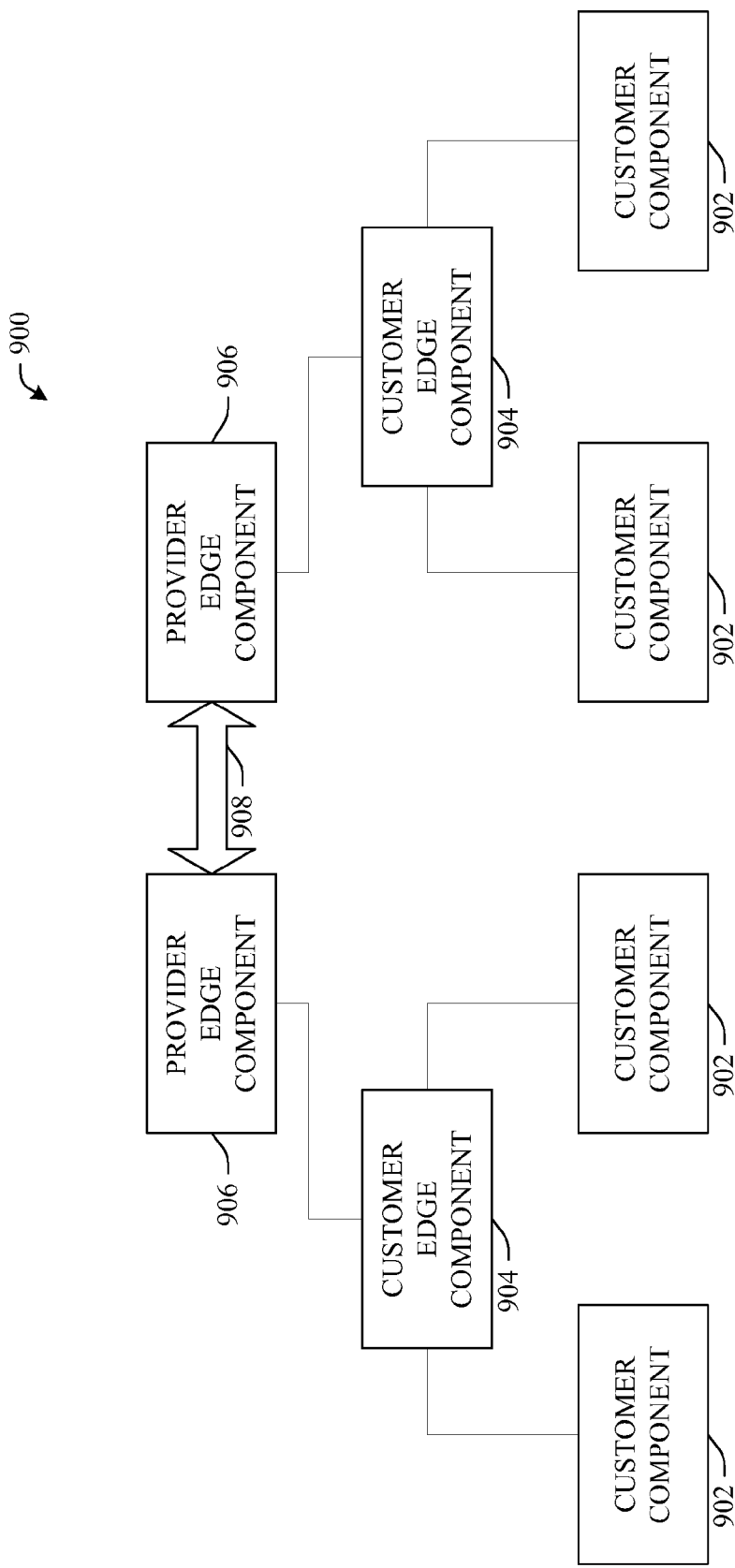
FIG. 9 illustrates an example block diagram of a communication configuration along a VPN.

FIG. 9 is an example of a communication link along a VPN 900. The communication link 900 has several components. A specific Customer component 902 sends information to a CE component 904. The CE component 904 communicates the information to a PE component 906. The PE component 906 then sends the information down an information path 908. The PE component 906 is often the same as the network device 106, 606 and the CE component 904 is normally the same as the origin device 108, 608 of FIGS. 1 and 6 respectively.

If a communication failure occurs, then the information is not able to travel to the intended destination. This usually means that the impacted units, sometimes called impacted subjects, are Customer components 902 and a CE component 904. An identifying component 104, 604 determines these impacted subjects based on the information gathered by an information gathering component 102, 602. While usually the identifying component 104, 604 only goes so far as to determine impacted CE components 904, it can be configured to determine impacted CE components 904, the impacted Customer components 902, and any other devices on the hierarchy if present. Since a VPN is commonly dynamic, there may be more components added or removed. Therefore, the number of impacted units can be more or less then the units displayed. The designations of 'source' and 'destination' are based on roles each device performs for information communication and each device can have each designation.

Figure 10:
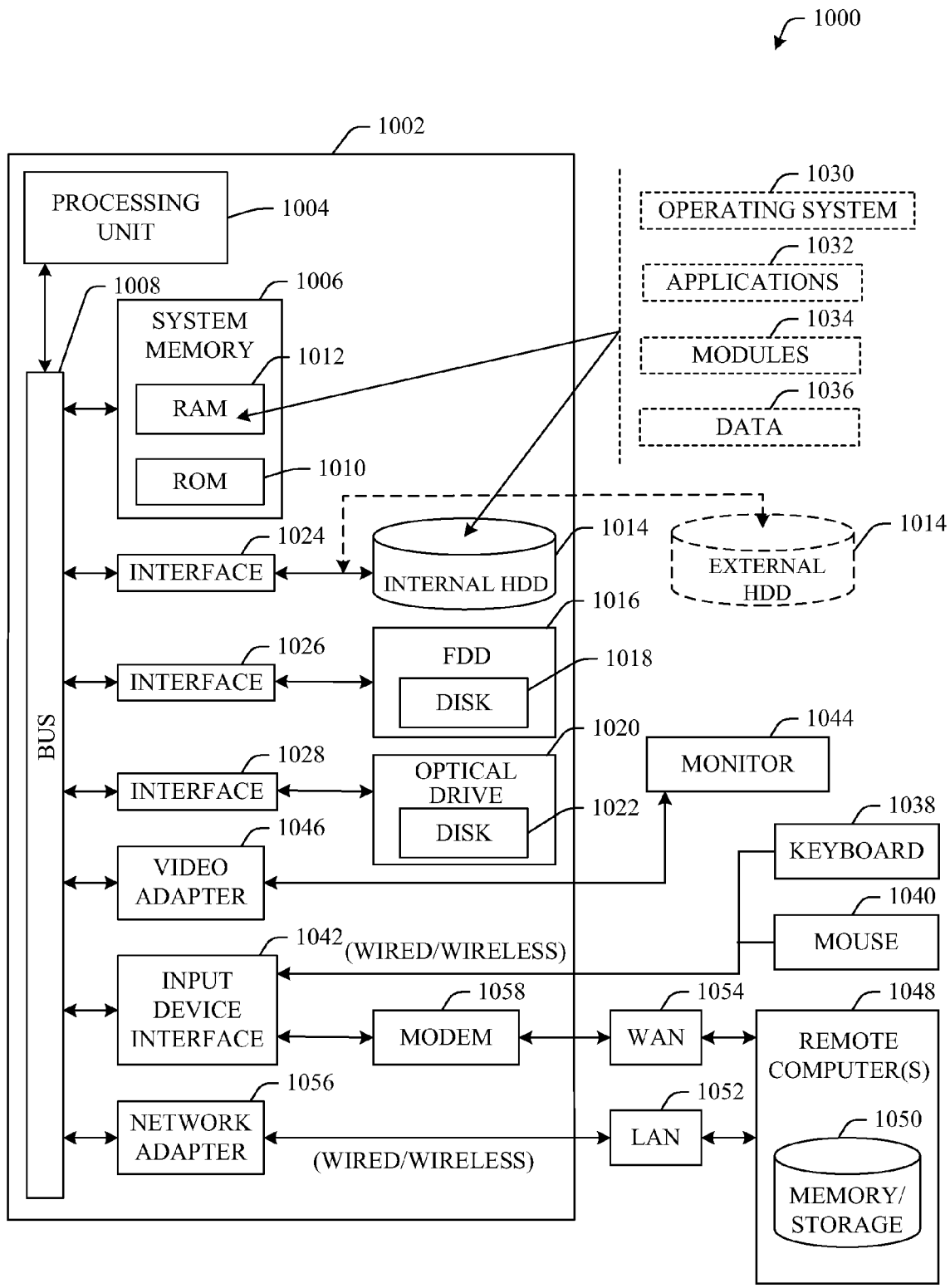
FIG. 10 illustrates an example of a schematic block diagram of a computing environment in accordance with the subject specification.

Referring now to FIG. 10, there is illustrated a block diagram of an example computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer generally includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media often embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

With reference again to FIG. 10, the example environment 1000 for implementing various aspects of the specification includes a computer 1002, which can be a Customer device 704, 902 as shown in FIG. 7 and FIG. 9 respectively, the computer 1002 including a processing unit 1004, a system memory 1006 and a system bus 1008. The system bus 1008 couples system components together, including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer generally includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
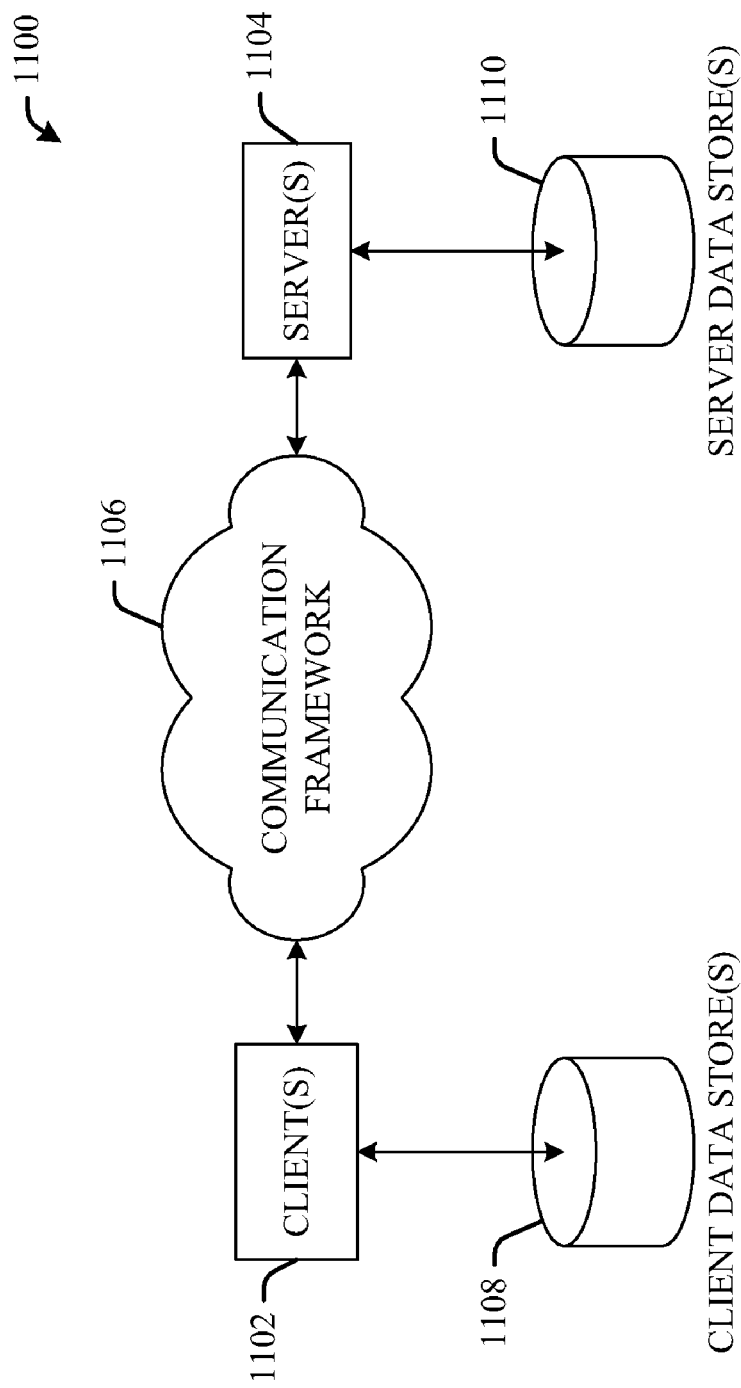
FIG. 11 illustrates an example of a block diagram of a computer operable to execute the disclosed architecture.

Referring now to FIG. 11, there is illustrated a schematic block diagram of an example-computing environment 1100 in accordance with the subject specification. The system 1100 includes one or more client(s) 1102. The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

This illustration shows how a different network setup can practice the subject specification. For instance, the network device 106, 606 in FIG. 1 and FIG. 6 respectively can be inside the communication framework 1106. The client(s) 1102 and server(s) 1104 can function as CE devices while the client data store(s) 1108 and server data store(s) 1110 can function as Customer devices.

Figure 12:
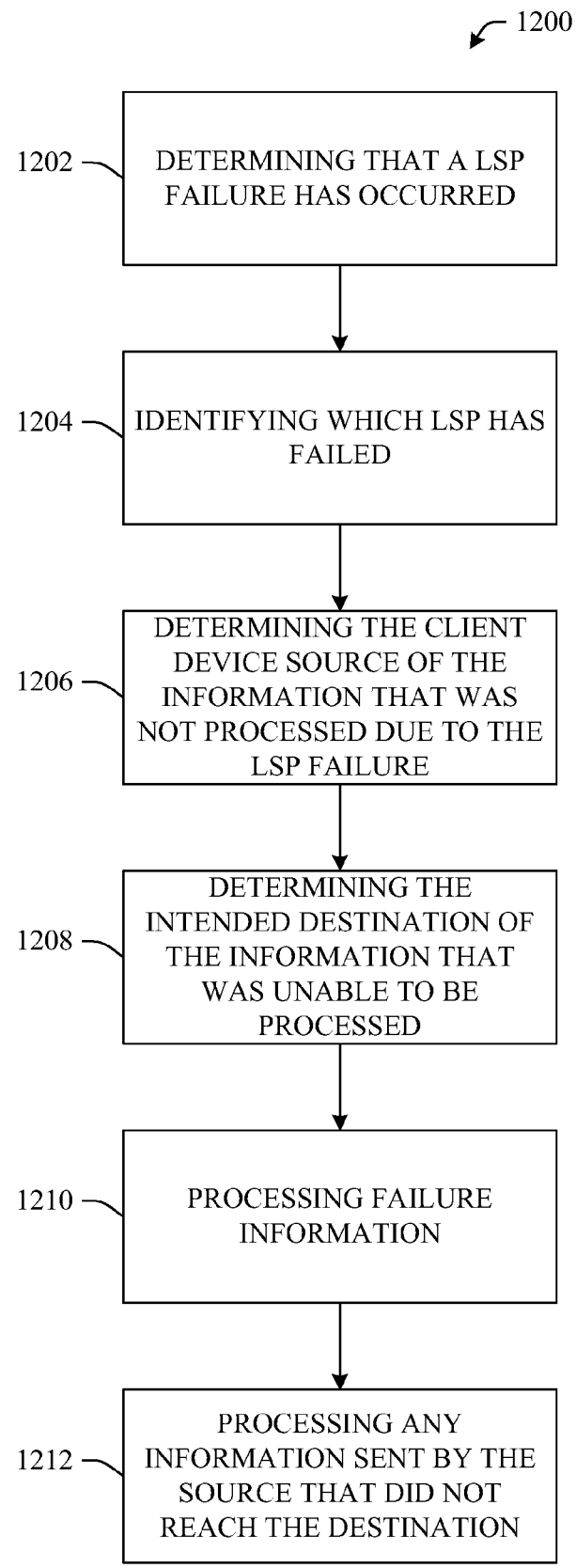
FIG. 12 illustrates an example of a block diagram of a methodology for general network failure management.

FIG. 12 is an example methodology of a LSP failure 1200. This methodology 1200 shows the overall network performance during a communication failure. The system first determines that there is a network failure 1202 such as an LSP failure. A network failure triggers performance of all other acts. Generally, a network device, particularly a source device, contains the necessary components for determining an LSP failure 1202. There is identification as to which LSP failed 1204. Again, the source device normally does this identification 1204.

There is a determination of the client source and intended destination of the information that is not processed 1206 and 1208. Here it is shown as two different events, one for the source 1206 and one for the destination 1208. There is a processing of failure information at step 1210. This event can be any number of acts, such as the acts described below in FIG. 13a and FIG. 13b. An action usually performed is determining any units impacted by the failure, specifically on the destination side. In addition, the information that did not successfully reach the source is processed 1212. An example of this processing is when the system attempts to complete the communication using a different LSP line. Though not shown as an event, it is also possible for the methodology to include a diagnostic event that attempts to or repairs the failed LSP.

Figure 13A:
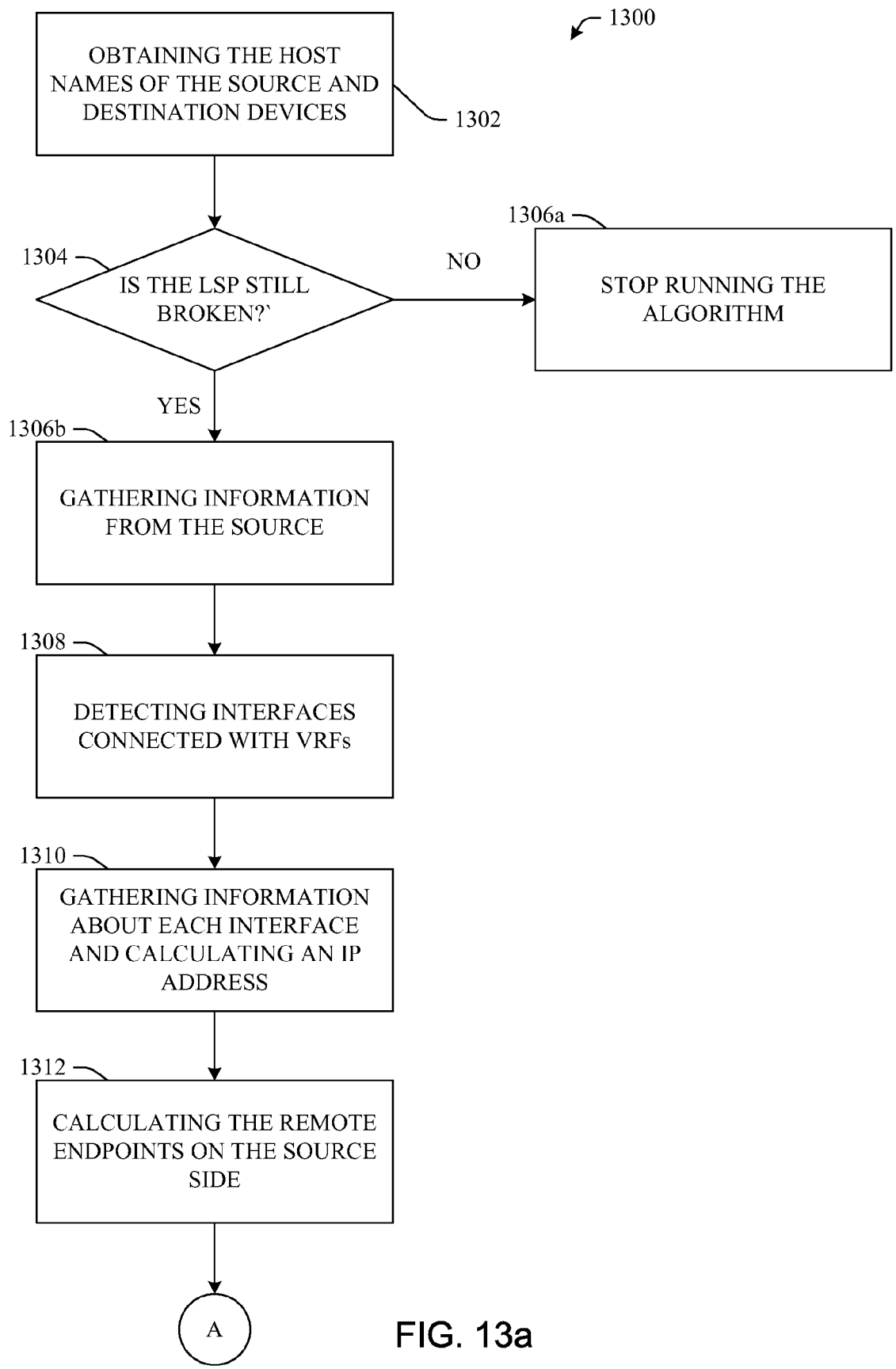
FIG. 13*a* illustrates an example of a block diagram of a first part of a methodology of an algorithm for generating a report.
Figure 13B:
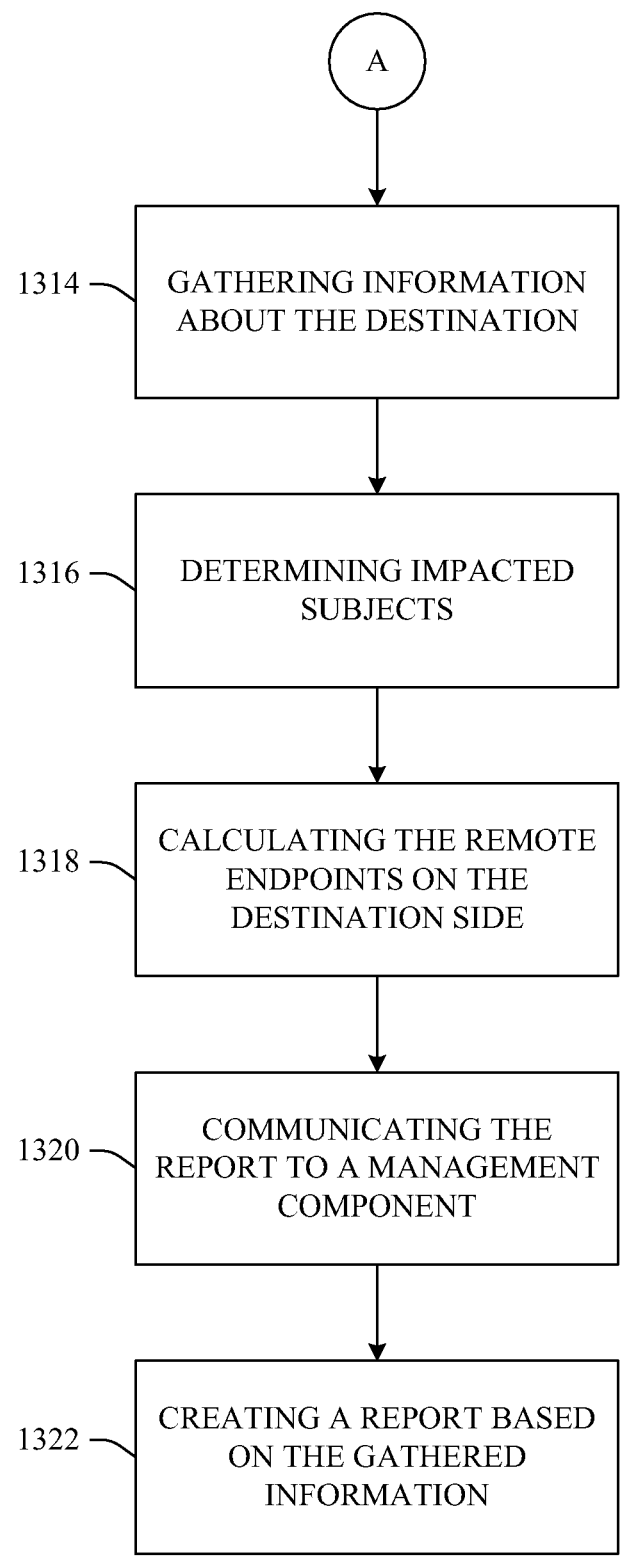
FIG. 13*b* illustrates an example of a block diagram of a second part of a methodology of an algorithm for generating a report.

FIG. 13a and FIG. 13b are an example methodology of an algorithm that operates the specification 1300. The methodology 1300 often begins when a management system receives notice of an LSP failure on an overall system. The algorithm is usually triggered by a monitoring component detecting a failure, which can be done by a trap function. The trap function contains a direct function that reports the failure. In the first act of the methodology, an algorithm obtains the host names of a source and a destination 1302. The algorithm performs this action in order to site other information in later events of the methodology. If the host names were not obtained, the only identification information available would be an IP address for the source and destination. This action is for reporting purposes, meaning that the information gathered is placed in a final report. This is a purely informational obtaining act. This action is not necessary, but it is quite useful. Many systems can be better equipped to process host names then an IP address alone.

1304 is the act in the methodology that verifies the LSP is still broken. When a failure occurs, a probe (e.g., from a perception component) notifies the component that runs the algorithm. If the LSP is no longer broken, then there is no need to continue with the algorithm. Therefore, the algorithm stops if the LSP is no longer broken 1306a. If the LSP is still broken, then the algorithm continues. Some of the later actions of the algorithm can be intensive in terms of time and processing. It can be detrimental to the system to run the algorithm if the LSP is no longer broken. To expedite this event in the methodology, the algorithm can use information obtained by the trap function in the previous event.

In the methodology, three acts are shown as one action, which is the event of gathering source information 1306b. While the three acts presented are distinct from one another, typically they can all run in the same command in the algorithm, which is why they are displayed as one act. The acts are obtaining the affected VRFs, the affected routes, and the affected labels (each of these being different actions in the algorithm). A command is run on a device that reported the failure to find out all customer VPNs that would use the destination reported in the failure. Essentially, this is telling the algorithm to find the VPNs that use unreachable destinations. This act is also an information-gathering action. This event only finds out the destinations; the colleting of destination information takes place in a later action.

Detecting the interfaces connected with affected VRFs 1308 takes place. This event is run on the device that reported the failure, commonly the source or the network device 106, 606. One purpose of this action is to detect all interfaces that connect with the VRFs. Typically, there are a number of interfaces that connect with each VRF. There are different types of interfaces, such as Ethernet interfaces or Digital Signal 3 interfaces. The algorithm finds all the interfaces and a separate command finds information about each of the interfaces and calculates the IP address of a remote endpoint 1310. It is to be appreciated that, although the above example suggests finding interfaces, it is to be appreciated that this is not always possible with other embodiments of the subject specification. This can be two different steps, but often times they are run concurrently, so they are shown as a single act. Some of the useful information obtained by this act is the role of the interface, what the interface connects to, and what the interface is intended to do. One group of information found is a set of labels, which have been advertised by the destination to get to any points beyond the destination. The algorithm determines a specific label failed from the result of a 'Next Hop' command. A 'Next Hop' command, specifically a BGP Next Hop, is a command to go to the destination of the LSP. Usually, the label information is critical information in the methodology. A loop and check can be substituted in the event's place. Often times a subnet is used, such as a /30 subnet.

In certain type of interfaces, such as point-to-point interfaces, it is possible to calculate an address of another site of the connection even though we only know a local site. Essentially, the system determines a LSP failure, shows the affected VRFs and circuits, and gathers information about them. A typical identifier usually includes alphanumeric text that represents information meaningful to an operator (e.g., customer and account number). In a particular example, the identifier could be ACME: 123, where ACME is a customer and 123 is a customer account number. Other examples of this would be 'FastFoods:333' and 'VenturesInc:562662'. For each identifier, the previous action is repeated. This repetition is not shown in the drawing because it is displayed as a general action of gathering information for all interfaces.

Calculating the remote endpoints on the source side occurs at event 1312. When configuring an IP address one can give the IP address a number of subnets. Specifically with a /30 subnet, an IP address can only be one of two values. The system can determine the endpoints on the destination side since there can only be one value remaining. Without the /30 subnet you cannot calculate the remote endpoint. The system can determine if there is a /30 subnet by looking at the indicators after an IP address. A typical IP address has a number of indicators after it. For instance, the IP address may be "7.1.1.1" while following the IP address there are indicators "255.255.255.252." Each indicator represents a subnet, while the portion "0.252" represents the /30 subnet.

At 1314, the system destination information is collected. When the failure occurs, some of the information communicated to the network device is the part of the network that reported the failure (e.g., source) and the part of the network that is unreachable (e.g., destination). Generally, the part of the network that reported the failure and the network device are the same component. The destination is communicated as an IP address. If not done in the first action, then the system could look up the host name of the destination here. Again, this act is not mandatory, but the information it provides is quite useful. This also allows the system to reach the destination and run commands on the destination if necessary.

The set of labels that were found in event 1306*b* are used in the act of determining the impacted subjects 1316, such as CE devices. The system uses the label information to determine the impacted subjects on the destination side; these impacted units are related locations. These subjects could have been impacted by the failure. The customer data that cannot reach its destination commonly has a label. For example, the destination label is 38. This label corresponds to a destination network belonging to the customer. This destination network can be called 'CE device 38'. There could be multiple destinations per customer per CE device. A destination label is unique to a VRF, so this is sufficient to distinguish destinations. The information attaches label 38 to itself so it can be directed to the correct CE device. When the failure occurs, the information with label 38 cannot arrive at its destination. The algorithm looks up VPN labels that are applied to traffic whose tunnel path destination would be the provider edge. The algorithm then looks up all other labels that are associated with the IP address. Since each label corresponds to a customer destination, the algorithm determines which destinations are impacted due to the label information. Therefore, the algorithm knows the impacted units from the label information.

At 1318, remote endpoints on the destination side are calculated. This is essentially the same function with the same subnet as calculating the remote endpoints on the source side. There is a slight difference that in that a VPN label is used to index into the VRF and hence obtain outgoing interfaces connected to the destination since the outgoing interfaces are contained within the VRF. This event determines the specific endpoints for the impacted subjects. The following act communicates information from the network device where at least the majority of actions commonly take place to a management component 1320. The final act creates a report with all the information that has been gathered 1322. A typical report contains the information about the interfaces and circuits affected. If possible, the report also contains locations in the world that are affected. A management component such as a network management system often produces the report. However, other locations can produce the report. For example, the report could be created on the network device, and thus eliminating the event of communicating the report to a management component. Either this report can go directly to a customer or it can be changed in format and sent to another system. For example, it can be saved in Extendable Markup Language (XML) format and transferred to another system.

There are at least two ways this report can be created. The first way is that a network administer makes a request to the system to create the report. The second way is under an umbrella fault system where each time a fault takes place, the system creates a report automatically. There can be further determinations based on the report. For example, many times a customer and a provider have a Service Level Agreement (SLA) that in part regulates the terms of use and the cost of the service. A part of a management system can use this report in determining the impact of the failure based on the SLA. For instance, the SLA can stipulate that for each failure that affects that customer, there is a cost reduction to a consumer by a specific percentage. Many times, a plurality of customers operate on a VPN using a source and destination. Different customers with different SLA agreements with different terms and penalties can be impacted by the same failure. The report allows a management system to calculate quickly and easily the affect concerning any relevant SLAs.

It is to be appreciated that the subject specification could operate in an automatic mode without the involvement of a human operator, or could also be used to help a human operator interpret a failure from the network. In the former, an embedded connectivity test would be run within the network devices, which would then trigger the algorithm. In the latter, an operator would initiate the connectivity test and if a failure is found, trigger the algorithm. In addition, the subject specification can function in situations that do require MPLS technology (e.g., there do not need to be labels). One example is in layer 2 Ethernet services. In such a network, the service (which is from customer device to customer device) is identified through different means, e.g., a virtual local area network remote endpoint identifier and unique service id. Networks of this type can contain perception components as previously described in the subject specification. Upon failure detection, an algorithm is triggered that determines impacted source and destinations without using label data. This is possible because the perception component (e.g., a detection mechanism) contains enough data to allow the source and destination devices to be interrogated. For example, a broken path can be indicated using a unique identifier for the destination and a unique identifier for the service (e.g., a tunnel path). By comparing those interfaces on the source and destination that are similarly configured for the same service, it is possible to determine which circuits (e.g., which are attached to the source and destination) would be affected. In this scenario, a detection mechanism contains enough data for both the source (e.g., detection point) and destination (e.g., multiple destinations since this could be a multipoint service) to be interrogated to obtain attached circuit data.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A network management system for determining impacted units, comprising:
   a gathering component that receives data from an origin device on a computer network, the received data including a label and being sent by the origin device to a target device within the computer network, extracts the label from the received data, and transmits the received data to the target device within the computer network; and
   an identifying component that identifies impacted units affected as a result of a network communication failure based on the data obtained by the gathering component, the identifying component comprising an analyzing component, a comparison component, and a searching component,
   wherein the analyzing component determines an Internet Protocol (IP) address that corresponds to the label;
   wherein the comparison component compares the label against information located in the source device to determine a Virtual Routing and Forwarding (VRF) that uses the IP address to reach the target device; and to determine, within the VRF, a customer destination label that uses the IP address, the customer destination label identifying an impacted unit that share a path connected to the target device, and the impacted unit being affected as a result of a network communication failure related to the path; and
   wherein the searching component searches for other impacted units identified by the customer destination label without contacting the target device and without the use of an offline topological map.

2. The system of claim 1, wherein the gathering component commences operation as a result of the network communication failure.

3. The system of claim 1, wherein the network communication failure comprises a failure where the received data does not reach an intended destination.

4. The system of claim 3, further comprising a verification component that verifies that the network communication failure exists.

5. The system of claim 1, further comprising a communication component that communicates the label to a management component, wherein the management component processes the label.

6. The system of claim 1, further comprising a creation component that creates a report based upon information relating to the target device within the computer network.

7. The system of claim 1, wherein the computer network is an MPLS (Multi-Protocol Label Switching) network.

8. The system of claim 1, further comprising a perception component that determines when the network communication failure occurs.

9. A method for network maintenance, comprising:
   extracting a label from received data from an origin device sent across a communication link to a target device within a computer network;
   transmitting the received data to the target device within the computer network;
   detecting a failure in the communication link to the target device;
   finding a Virtual Routing and Forwarding (VRF) based on the label, the VRF being affected by the failure of the communication link;
   detecting an interface connected with the VRF;
   finding information about the interface from a table associated with the VRF; and
   based on the information, calculating an Internet Protocol (IP) address of an endpoint associated with the interface;
   identifying impacted units affected as a result of a network communication failure based on the label, the Internet Protocol (IP) address that corresponds to the label, the Virtual Routing and Forwarding (VRF) that uses the IP address to reach the target device, and a customer destination label that uses the IP address, the customer destination label identifying an impacted unit that share a path connected to the target device, and the impacted unit being affected as a result of a network communication failure related to the path; and
   searching for other impacted units identified by the label without contacting the target device and without the use of an offline topological map.

10. The method of claim 9, wherein the detecting of the failure comprising checking that a transport breakdown exists, wherein the finding of the VRF takes place after an occurrence of the transport breakdown.

11. The method of claim 9, further comprising generating a summary containing the IP address of the endpoint.

12. The method of claim 11, wherein generating the summary takes place in a network management component.

13. The method of claim 9, wherein the information is used to identify an affected entity resulting from the failure of the communication link.

14. The method of claim 9, wherein the IP address is used to identify an affected entity resulting from the failure of the communication link.

15. The method of claim 14, further comprising communicating the affected entity identity to an administration component.

16. The method of claim 9, wherein the calculating of the IP address does not include reliance on a network model.

17. A network maintenance system, comprising:
means for receiving data that includes a label, extracting the label from the received data sent from an origin device to a network that relates to a target device, and transmitting the received data to the target; and means for:
determining an Internet Protocol (IP) address that corresponds to the label;
determining a Virtual Routing and Forwarding (VRF) that uses the IP address to reach the target device;
determining, within the VRF, a customer destination label that uses the IP address, the customer destination label identifying an impacted unit that share a path connected to the target device, and the impacted unit being affected as a result of a network communication failure related to the path;
identifying impacted units affected as a result of a network communication failure based on the label, the Internet Protocol (IP) address that corresponds to the label, the Virtual Routing and Forwarding (VRF) that uses the IP address to reach the target device, and a customer destination label that uses the IP address, the customer destination label identifying an impacted unit that share a path connected to the target device, and the impacted unit being affected as a result of a network communication failure related to the path; and
searching for other impacted units identified by the customer destination label without contacting the target device and without the use of an offline topological map.

18. The network maintenance system of claim 17, wherein the impacted unit is identified without contact with the target and without use of an offline topological map.

19. The method of claim 9, wherein the information about the interface is at least one of a role of the interface, a connection of the interface, or a functionality of the interface.

20. The method of claim 9, wherein the interface is at least one of an Ethernet interface or a Digital Signal 3 interface.

* * * * *